April 28, 1925.

J. B. BRENNAN 1,535,647

CORD TIRE STOCK AND METHOD OF MAKING SAME

Filed Dec. 18, 1919     2 Sheets-Sheet 1

INVENTOR:
Joseph B. Brennan
by MacLeod, Calver, Copeland and Dike
Attys.

April 28, 1925.

J. B. BRENNAN 1,535,647

CORD TIRE STOCK AND METHOD OF MAKING SAME

Filed Dec. 18, 1919   2 Sheets-Sheet 2

INVENTOR:
Joseph B. Brennan
by MacLeod, Calver, Copeland & Dike
Attys.

Patented Apr. 28, 1925.

1,535,647

UNITED STATES PATENT OFFICE.

JOSEPH B. BRENNAN, OF ORANGE, NEW JERSEY.

CORD-TIRE STOCK AND METHOD OF MAKING SAME.

Application filed December 18, 1919. Serial No. 345,728.

*To all whom it may concern:*

Be it known that I, JOSEPH B. BRENNAN, a citizen of the United States, residing at Orange, county of Essex, State of New Jersey, have invented a certain new and useful Improvement in Cord-Tire Stock and Methods of Making Same, of which the following is a specification, reference being had therein to the accompanying drawings.

My invention has for its object a continuous or endless band of cord-stock for use in the manufacture of pneumatic tires for vehicles; also the method of making these endless bands of cord-stock.

In the manufacture of cord tires as practised commercially, three methods have been chiefly employed; first, the cords are laid back and forth over the tire core by a machine; second, the tire has been built up by applying strips of cord-stock to the core, the cord stock being composed of cords interwoven with frail threads; and third, by laying frictioned cords back and forth between two wire rings which are later incorporated into the beads of the tire. These methods are each subject to different objections well understood by those skilled in the art.

My present invention does away with these objections and produces tires which are stronger and more durable and at lower costs. In practising my invention, I produce on a cylindrical mandrel a tube composed of a layer or layers of parallel frictioned cords and then cut the tube up into endless bands by cuts which may be at any suitable angle to the axis of the mandrel. The diameter of the mandrel is about the size of the tube to be manufactured, thus for a 34 inch tire a mandrel about 32 inches in diameter will be used. The cords in the layers of the tube from which the endless bands are cut may be arranged in several ways as will be more fully explained hereafter. After these bands have been thus produced, one or more of them are put in place on the tire core either by being stretched over it or by having an expansible core or air bag expanded into the band. In either case the completed tire is characterized by being composed of one or more endless bands of cord-stock. One of the chief advantages of my invention resides in the fact that there are no places of increased thickness producing unequal strains on the cords as is the case where the tire is made up from a strip of cordstock wound onto the tire in a circumferential helix in the manner ordinarily used in making fabric tires.

The invention will be fully understood from the following description when taken in connection with the accompanying drawings, and the novel features thereof will be pointed out and clearly defined in the claims at the close of this specification.

In the drawings, Fig. 1 is illustrating the method employed in producing an endless band of cord tire stock embodying the invention.

Figure 1:
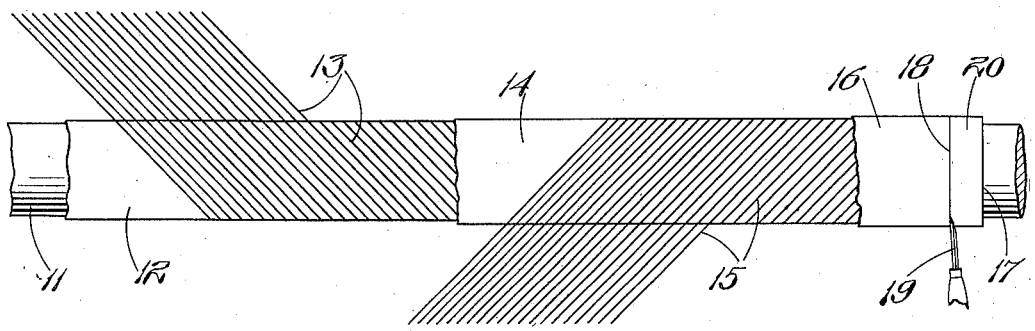
Figure 2:
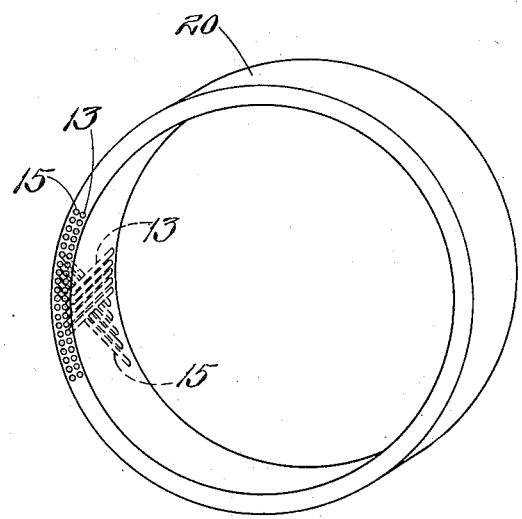
Fig. 2 is a view in perspective of an endless band embodying my invention, made as shown in Fig. 1, the thickness being exaggerated for clearness of illustration.
Figure 3:
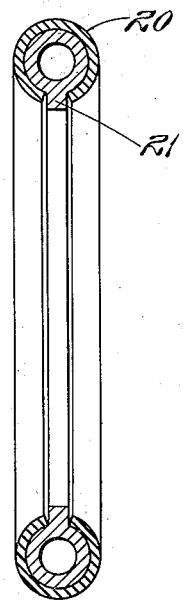
Fig. 3 is a section of a tire core to which is applied the endless band shown in Figure 2.

Referring now to the drawings and particularly to Figure 1. At 11 is shown a mandrel of diameter large enough to produce bands of about the size of the tire to be made therefrom. Thus for a 34 inch tire, a mandrel about 30 inches in diameter will be employed. On this mandrel is placed a thin layer 12 of frictioning material and on this is wound a layer of parallel cords 13 preferably at 45° to the axis of the mandrel. On this is laid another layer 14 of frictioning material and then a second layer of cords 15 is wound on. This layer of cords is wound in the reverse direction so that the cords of the two layers cross each other at about right angles. Thereafter an outer coating of frictioning material 16 is applied. The procedure up to this point forms a tube on the exterior of the mandrel. The tube thus formed is then cut along parallel lines 17 and 18 as by a knife 19, and endless bands 20 are thus formed. The bands are then removed from the mandrel. One of the bands 20 thus produced is shown in Figure 2, the size of the cords and the thickness of the frictioning layers being exaggerated so that they will be more easily distinguishable.

In making the tire, one or more bands 20 made as previously explained are placed on a tire core 21, the edges being worked down into place to form the side wall. If desired an expansible core or an air bag can be used and expanded into the band to cause it to take the proper shape.

The endless bands, owing to the arrangement of the cords and to the fact that they are held together only by the frictioning material, are quite elastic, particularly circumferentially between the two side edges, as long as the ends of the cords are not secured in place. When the beads are added, the ends of the cords are secured so that the cords then take the load of the air pressure in the tire.

Figure 4:
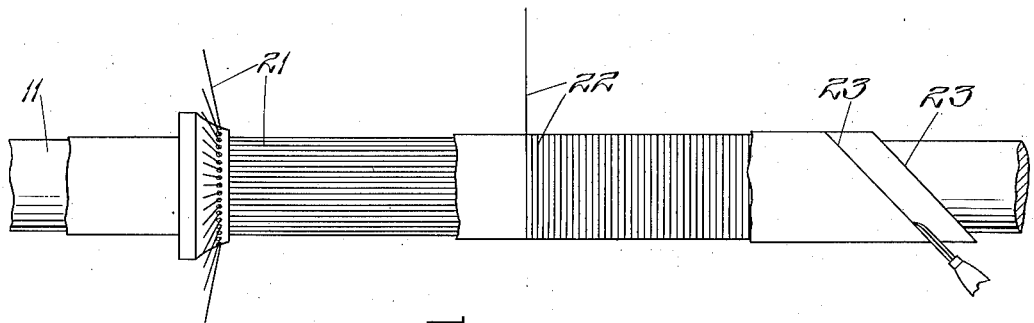
Figs. 4, 5 and 6 illustrate the methods of making endless bands embodying my invention, the arrangement of the cords being different than that shown in Fig. 1.

In Figure 4 the cords 21 are laid parallel with the axis of the mandrel, and the cords 22 are laid circumferentially and practically at right angles with the cords 21. The bands are then cut on lines 23 at 45° to the axis, and are afterwards made up into the tires as previously described.

Figure 5:
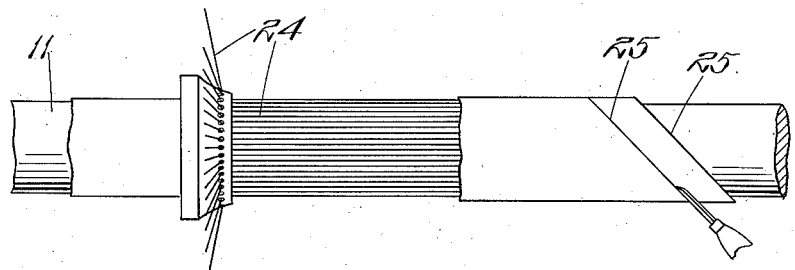

In Figure 5, there is shown a method of making up a band comprising a single layer of cords 24 which are laid parallel with the axis of the mandrel, the tube thus formed being cut along lines 25 at an angle of 45° to the axis.

Figure 6:
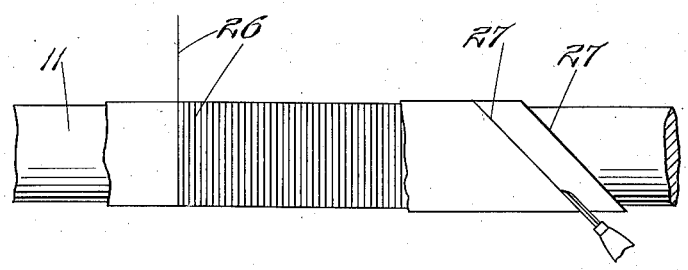

In Figure 6, there is shown still another method of making up a band having a single layer of cords 26. These cords are wound circumferentially of the mandrel at substantially right angles to its axis, and the tube thus formed is cut along the lines 27 at an angle of 45° to the axis.

What I claim is:—

1. A cylindrical, seamless tube which is adapted to be cut transversely to form a plurality of endless and seamless bands of stock for use in pneumatic tires, said tube comprising a layer of frictioned cord enclosed between layers of frictioning material.

2. A cylindrical seamless tube which is adapted to be cut transversely to form a plurality of endless and seamless bands of stock for use in pneumatic tires, said tube comprising a layer of frictioned cord enclosed between layers of frictioning material, there being a layer of frictioning material over the entire inner periphery and a layer of frictioning material over the entire outer periphery of said tube.

3. The method of making cord-stock for a pneumatic tire which consists in laying frictioned cords in parallel relation with each other about a cylindrical mandrel to form a layer and then cutting the layer into endless, seamless bands.

4. The method of making a continuous band of cord-stock for a pneumatic tire which consists in covering a cylindrical mandrel with a layer of frictioning material, winding frictioned cords spirally about the mandrel to form a layer of cords and then cutting the layers into seamless bands along a circumferential line.

5. The method of making a continuous band of cord-stock for a pneumatic tire which consists in covering a cylindrical mandrel with a layer of frictioning material, winding frictioned cords spirally about the mandrel to form a layer of cord, covering this layer with another layer of frictioning material, winding another layer of frictioned cords crosswise of the first layer, and cutting the layer into bands along a circumferential line.

In testimony whereof I affix my signature.

JOSEPH B. BRENNAN.